United States Patent
Auerbach et al.

(10) Patent No.: US 10,875,474 B2
(45) Date of Patent: Dec. 29, 2020

(54) FASTENING ARRANGEMENT FOR A STRUCTURAL ELEMENT ON A VEHICLE BODY PART OF A MOTOR VEHICLE

(71) Applicant: Dr. Ing. h.c. F. Porsche Aktiengesellschaft, Stuttgart (DE)

(72) Inventors: Michael Auerbach, Stuttgart (DE); Robert Kleiner, Hemmingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 10 days.

(21) Appl. No.: 16/296,860

(22) Filed: Mar. 8, 2019

(65) Prior Publication Data

US 2019/0283691 A1    Sep. 19, 2019

(30) Foreign Application Priority Data

Mar. 19, 2018    (DE) .................. 10 2018 106 325

(51) Int. Cl.
| | | |
|---|---|---|
| *B60R 13/04* | (2006.01) | |
| *B62D 27/06* | (2006.01) | |
| *B62D 25/00* | (2006.01) | |
| *B62D 35/00* | (2006.01) | |
| *B62D 27/04* | (2006.01) | |
| *B62D 25/06* | (2006.01) | |

(52) U.S. Cl.
CPC .............. *B60R 13/04* (2013.01); *B62D 25/00* (2013.01); *B62D 35/007* (2013.01); *B62D 25/06* (2013.01); *B62D 27/04* (2013.01); *B62D 35/00* (2013.01)

(58) Field of Classification Search
CPC ...... B60R 13/04; B62D 35/00; B62D 35/007; B62D 25/00; B62D 27/06
USPC ................................ 296/210, 180.1
See application file for complete search history.

(56) References Cited

U.S. PATENT DOCUMENTS

| | | | |
|---|---|---|---|
| 5,080,412 A * | 1/1992 | Stewart | B60R 19/03 293/120 |
| 5,176,482 A | 1/1993 | Reinl | |
| 7,731,275 B2 * | 6/2010 | Bergmiller | B60J 7/022 296/216.08 |
| 7,922,239 B2 | 4/2011 | Mathes et al. | |
| 9,296,282 B2 * | 3/2016 | Dayoub | B60J 7/047 |
| 2003/0090126 A1 * | 5/2003 | Adams | B62D 35/007 296/180.1 |
| 2005/0017491 A1 * | 1/2005 | Mein | B60R 11/00 280/762 |
| 2008/0197675 A1 | 8/2008 | Noires | |

(Continued)

FOREIGN PATENT DOCUMENTS

| | | |
|---|---|---|
| DE | 3938547 A1 | 5/1991 |
| DE | 19728557 A1 | 1/1998 |

(Continued)

*Primary Examiner* — Dennis H Pedder
(74) *Attorney, Agent, or Firm* — RatnerPrestia

(57) ABSTRACT

A fastening arrangement for a structural element, such as a structural design element, on a vehicle roof of a motor vehicle. The fastening arrangement includes a receiving device, which is fixedly connected to the vehicle roof, and a holding device for fastening the structural element. In this case, the holding device is received in a defined manner on the receiving device by a plurality of adjustable fastening devices, and the structural element is received adjusted in a defined manner in an X, Y and Z direction.

15 Claims, 4 Drawing Sheets

(56) References Cited

U.S. PATENT DOCUMENTS

2012/0111648 A1* 5/2012 Terashima .......... B60K 7/0007
                                                 180/6.2
2014/0167454 A1* 6/2014 Clapie .................. B62D 27/065
                                                 296/203.02
2017/0036706 A1    2/2017 Donabedian et al.

FOREIGN PATENT DOCUMENTS

| DE | 10010709 C1 | 8/2001 |
| DE | 202005006879 U1 | 8/2006 |
| DE | 102005044283 A1 | 4/2007 |
| DE | 102015010561 A1 | 3/2016 |

* cited by examiner

FASTENING ARRANGEMENT FOR A STRUCTURAL ELEMENT ON A VEHICLE BODY PART OF A MOTOR VEHICLE

CROSS-REFERENCE TO RELATED APPLICATION

This application claims priority to German Patent Application No. DE 10 2018 106 325.3, filed Mar. 19, 2018, which is incorporated by reference herein in its entirety.

FIELD OF THE INVENTION

The present invention relates to a fastening arrangement for a structural element, in particular for a structural design element, on a vehicle body part, in particular on a vehicle roof, of a motor vehicle, and preferably of a passenger car, wherein the fastening arrangement comprises a receiving device, which is fixedly connected to the vehicle roof or vehicle body part, and a holding device for fastening the structural element.

BACKGROUND OF THE INVENTION

The prior art has disclosed various fastening arrangements in order to fasten structural elements, such as structural design elements, to vehicle components.

DE 100 10 709 C1, which is incorporated by reference herein, has disclosed an adjusting apparatus for a cockpit crossmember, wherein the cockpit crossmember has an end-side flange plate and is held on a mounting block using screw means. Structural elements of this kind, such as a cockpit crossmember, have to absorb high loads during operation. Accordingly, a high load-bearing capacity is required, as a result of which correspondingly large and heavy connecting elements have to be used.

In contrast to this, described herein is a fastening arrangement for a structural element, such as a structural design element, on a vehicle body part, such as a vehicle roof, of a motor vehicle, and in particular of a passenger car, with which orientation of the structural element in three spatial directions, that is to say in an X, Y and Z direction or in a longitudinal, transverse and a vertical direction, in a defined manner is possible in order to allow visually pleasing orientation of the structural element in relation to, for example, a separate assembly or the like.

SUMMARY OF THE INVENTION

A fastening arrangement according to aspects of the invention for a structural element, and in particular a structural design element, on a vehicle body part of a motor vehicle, and preferably of a passenger car, comprises a receiving device, which is fixedly connected to the vehicle body part, and a holding device for fastening the structural element. The holding device is received in a defined manner on the receiving device by means of a plurality of adjustable fastening devices, so that the structural element is received adjusted in a defined manner in three spatial directions, for example in the X, Y and Z direction with respect to the mounting direction or with respect to the vehicle. In this case, defined adjustment of the structural element, which is embodied as a structural design element for example, relative to a separate assembly or structural unit is possible in particular.

The fastening arrangement according to aspects of the invention has many advantages. One considerable advantage of the fastening arrangement according to aspects of the invention is that reliable arrangement of a structural element, such as a structural design element, on a vehicle body part of a motor vehicle in a manner adjustable in all spatial directions is possible using simple means. In this case, orientation in relation to other components, assemblies or units can also be possible. This allows particularly flexible mounting and a visually pleasing design of a passenger car.

The X, Y and Z direction are understood to mean, in particular, a longitudinal, transverse and a vertical direction with respect to the motor vehicle. In this case, the individual axes can also deviate from the vertical or horizontal direction and the longitudinal direction, in particular can be inclined thereto. However, the three coordinates generally span a three-dimensional coordinate system, the axes of which can be, but do not have to be, at right angles to one another and in any case differ in respect of their orientation.

In preferred developments, the structural element is arranged relative to an assembly which is arranged in the region of the vehicle body part and is from the outside. The structural element is particularly preferably fitted directly adjacent to the assembly which is visible from the outside. In particular, both the structural element and also the assembly are each visible from the outside. In particularly preferred refinements, the structural element and the assembly form a visually coherent structural unit overall. A very flexible design and construction are rendered possible owing to the fastening arrangement according to aspects of the invention.

The structural element and the assembly are preferably fastened to the vehicle body part separately from one another. It is possible for the assembly to be fastened to a (first) vehicle body component and for the structural element to be separately fastened to the same or to a separate second vehicle body component. For example, the first vehicle body component can be connected to the vehicle body or formed by said vehicle body and the second vehicle body component consists of, for example, a separate glass roof which forms part of the vehicle body component.

Owing to the fastening arrangement, the position of the structural element, which is embodied as a structural design element for example, can be adjusted relative to the assembly. As a result, tolerances during manufacture and mounting can be compensated for and, nevertheless, a reproducible and visually high-quality and pleasing design of the vehicle body component and of the entire motor vehicle can be achieved, this design also satisfying high and extremely high demands. This can create the visual impression that the structural element and the assembly form a coherent or uniform structural unit.

A, and in particular each, fastening device preferably comprises a receiving part on the receiving device and a vertically adjustable support part, which interacts with the receiving part, for vertically adjusting the holding device in the Z direction or in a vertical direction which is perpendicular to a fastening surface. In advantageous refinements, the receiving part can be formed, for example, in a sleeve-like manner or have a sleeve-like section. In refinements of this kind, it is preferred for the support part to enter the receiving part or the sleeve-like section of the receiving part. However, it is also possible for the support part to have a sleeve-like section and to be screwed onto a rod-like section of the receiving part, which rod-like section is provided with an external thread for example.

In preferred refinements, the support part has a thread section and at least one support section, which extends transversely to said thread section, and a tool section. In this case, the support section can be formed, for example, as a partially or fully peripheral support plate. It is also possible for a plurality of separate support sections to be arranged around the periphery of the support part. A suitable tool can be guided to the tool section in order to perform, for example, vertical adjustment of the support part on the receiving part. For example, the tool section can have a polygonal internal shape, such as for example a square internal shape or a hexagonal internal shape, or a polygonal external shape, such as for example a square external shape or a hexagonal external shape. It is also possible, for example, for the tool section to have an internal Torx. Other configurations of the tool section are also possible. It is also possible for the tool section to have a corresponding outer shaping.

In preferred developments, the support part has a or at least one guide section. The guide section is provided, in particular, for guiding the holding device. As a result, the holding device can be at least roughly positioned on the receiving device in the X and Y direction or in a mounting longitudinal or mounting transverse direction.

The guide section preferably projects beyond the support section in the Z direction or in a mounting vertical direction. The tool section is particularly preferably formed on said guide section. For example, the guide section can be formed by an external cylinder, while the tool section is formed by a square internal shape or a hexagonal internal shape or the like, as described above. It is possible, for example, for the support section to be formed by an annular support plate beyond which a sleeve-like section projects, wherein the external cross section serves as a guide section and the internal contour serves as a tool section.

In advantageous developments, the thread section of the support part comprises an external thread and interacts with an internal thread in the receiving part. An inverted construction is also possible, in which the thread section comprises an internal thread and interacts with an external thread of the receiving part.

In all refinements, it is preferred for the thread section of the support part to be of self-locking and/or self-tapping design. In the case of a self-tapping thread section of the support part, a corresponding thread does not have to be formed before mounting on the receiving part. Self-locking is achieved directly by a self-tapping thread. However, in addition or instead, it is also possible for the thread section of the support part and/or of the receiving part to be provided with a inhibiting coating in order to reliably prevent the connection being independently loosened during or after mounting.

The holding device is preferably fastened to the support parts by means of fastening elements. In this case, it is preferred for in each case one fastening element to be provided for one support part. In particular, at least one fastening element is screwed and/or adhesively bonded to a support part. It is possible, for example, for a thread region of the fastening element to be provided with an adhesive before the fastening element is screwed to the support part. However, a purely adhesive connection is also possible, in the case of which the fastening element is directly adhesively bonded to the support part.

In all refinements, it is preferred for at least one receiving hole to be formed in the holding device. Two, three, four or more receiving holes are preferably formed on the holding device. At least one receiving hole is particularly preferably provided and at least the plurality of receiving holes are preferably provided or all of the receiving holes are each provided with a larger cross section than the cross section of the guide section of the support part. This ensures that, after the holding device is supported on the support parts, the guide sections pass through the receiving holes and preliminarily roughly position the holding device. Fine positioning can be adjusted in the Z direction or vertically by screwing in and unscrewing the support parts. In the X and Y direction, that is to say in the longitudinal and transverse direction of the motor vehicle, fine adjustment can be performed by shifting the holding device in order to allow the desired and optimum position of the structural element on the vehicle roof.

In particularly preferred refinements, at least one receiving hole or all of the receiving holes are each formed as a rectangular hole. This allows adjustment in the X and Y direction.

The structural element is preferably fastened to or the vicinity of a glass roof segment of the vehicle roof. The receiving device is preferably fastened, in particular, by encapsulation by foaming. As an alternative, the receiving device can be (at least partially) integrated into the respective vehicle body part. The encapsulation by foaming or adhesive bonding can be performed at the same time (in one working process) as the fastening of the vehicle body part or the glass roof segment. The assembly is particularly preferably fastened to a vehicle body part, and in particular roof segment, which forms part of the vehicle body. In refinements of this kind, relative positioning of the structural element in relation to the assembly and optionally other vehicle body components by the receiving device is possible.

The concepts disclosed herein render possible a receiving and adjusting concept for a structural element, such as a structural design element, on a vehicle body part, and in particular a vehicle roof. In this case, the structural element can be, for example, glued into the vehicle body on or adjacent to a panoramic roof. A screening element can then be adhesively bonded and the support parts for the structural design element can be inserted and vertically positioned (and spatially oriented). After this, the holding device can be fastened by way of fastening elements and the structural element can be mounted on the holding device.

In a preferred refinement, a fastening arrangement for a structural design element on a vehicle roof of a passenger car comprises a receiving device, which is fixedly connected to the vehicle roof, and a holding device for fastening the structural design element. The holding device is received in a defined manner on the receiving device by means of a plurality of adjustable fastening devices, so that the structural design element is received adjusted in a defined manner in an X, Y and Z or in a longitudinal, transverse and vertical direction. In this case, defined adjustment of the structural design element relative to a separate assembly or structural unit is possible in particular.

BRIEF DESCRIPTION OF THE DRAWINGS

Further advantages and features of the present invention can be gathered from the description of the exemplary embodiment which is explained below with reference to the appended figures.

In the figures.

DETAILED DESCRIPTION OF THE INVENTION

Figure 1:
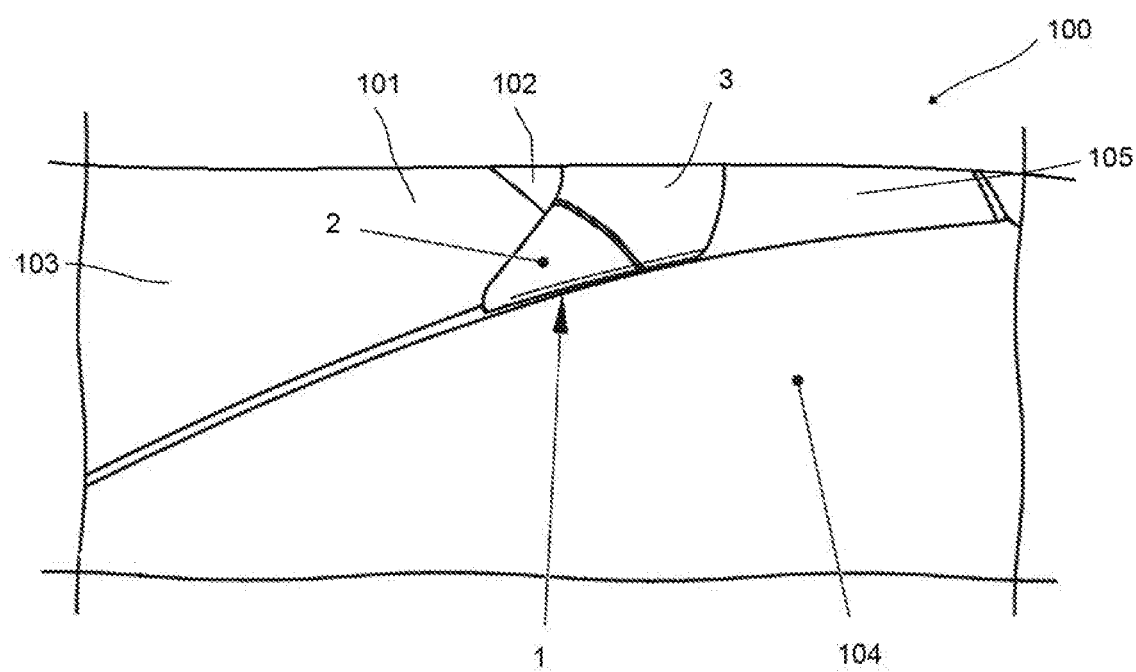
FIG. 1 shows a schematic perspective view of a motor vehicle.

FIG. 1 shows a schematic perspective view of a motor vehicle 100 which is embodied as a passenger car here. A section of the vehicle body part which is embodied as a vehicle roof 101 here, the rear windshield 105 and a portion of the vehicle body 104 of the motor vehicle can be seen. An assembly 3, which is embodied as a roof spoiler here, is mounted on the vehicle body part or the vehicle roof 101. In this case, the assembly 3 is preferably connected to the vehicle body 104.

Two different vehicle body components, which are embodied as roof components 102 and 103 here, are provided on the vehicle roof 101. In this case, the vehicle body component or roof component 103 consists of a glass roof segment, such as for example a panoramic roof. A structural element 2, which serves as a structural design element here, is mounted on the vehicle roof 101 next to the assembly 3. The structural element 2 and the assembly 3 can be mounted on the same segments or on different components of the vehicle roof 101. In any case, mounting tolerances are compensated for, said mounting tolerances also being produced, for example, by the receiving device 10 (compare FIG. 2) having a slightly different position in different mounting processes. The fastening arrangement 1 serves to compensate for mounting tolerances of this kind.

Figure 2:
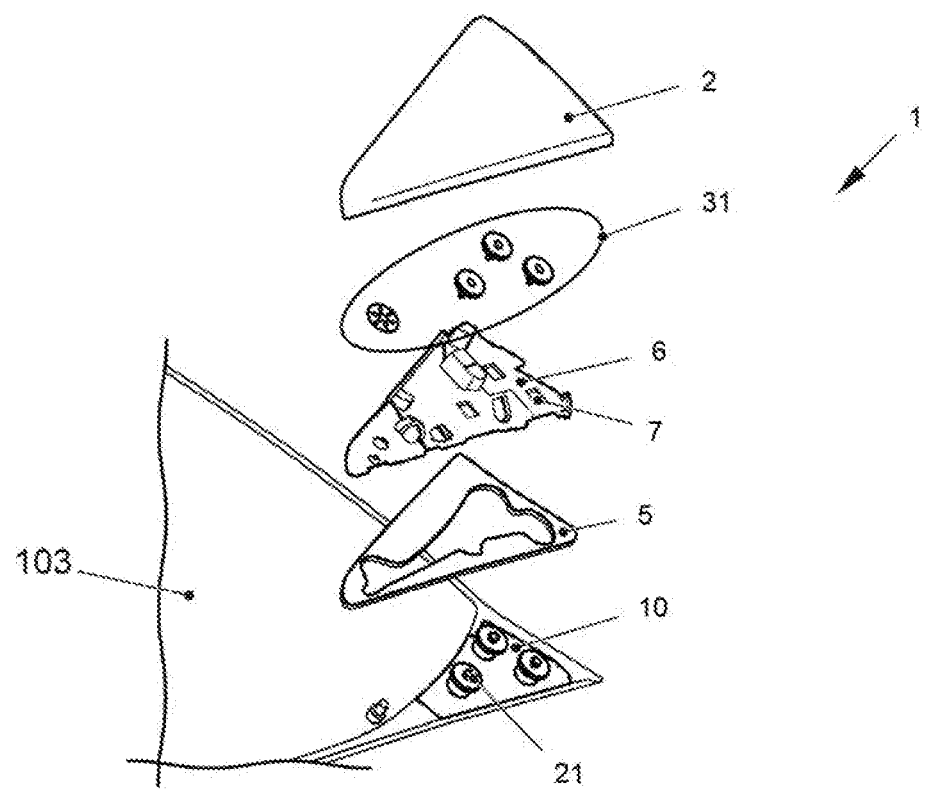
FIG. 2 shows an exploded illustration of a fastening arrangement according to aspects of the invention for a structural element on the vehicle body part of the motor vehicle according to FIG. 1.

The fastening arrangement 1 is depicted in an exploded illustration in FIG. 2. The roof component 103 of the vehicle roof 101 can be seen in said figure. Adjacent to the roof component 103, the receiving device 10 has been incorporated by foaming or adhesively bonded during mounting of the roof component 103. The receiving device 10 comprises receiving parts 11 which cannot be seen here in FIG. 2 since support parts 21 are already screwed onto said receiving parts in the illustration according to FIG. 2. Here, a screen 5 which is placed and adhesively bonded onto the receiving device 10 is depicted above the receiving device 10. The holding device 6 which has receiving holes 7 can be seen above said screen here. The holding device 6 is connected to the support parts 21 by means of a plurality of fastening elements 31. The structural element 2 is finally mounted onto the holding device 6 after the holding device 6 has been suitably oriented in all directions.

Here, the support parts 21 together t the receiving parts 11 and the fastening elements 31 form one or more fastening devices 30. The mounting operation is explained below with reference to the further figures.

Figure 3:
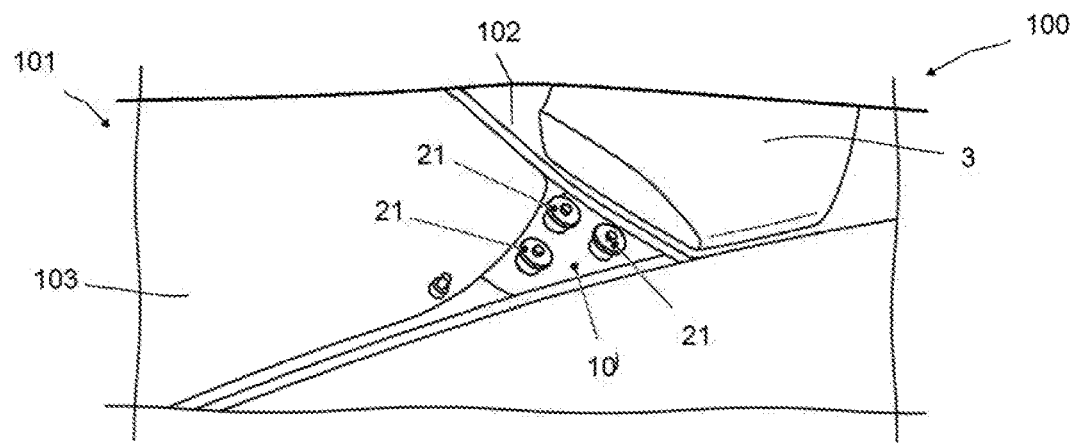
FIG. 3 shows a drawing of a detail in a first mounting step.

FIG. 3 shows an enlarged detail of the vehicle roof 101 of the motor vehicle 100, wherein the roof component 103 (for example a panoramic roof) has been fitted onto the vehicle body 104. Adjacent to the roof component 103, a receiving device 10, together with the roof component 103, has been fastened to the vehicle body 104 by, for example, incorporation by foaming or adhesive bonding. As a result, a minimum number of different positions of the receiving device 10 can be produced in different motor vehicles during assembly. The structural element 2 is fastened to the receiving device and visually forms a unit with the assembly 3.

The fastening arrangement 1 serves to compensate for the tolerances, the receiving device 10 of said fastening arrangement being shown here, with support parts 21 which serve for positioning and holding the holding device 6 already being attached to the receiving parts 11 (compare FIG. 5) of said receiving device.

Figure 4:
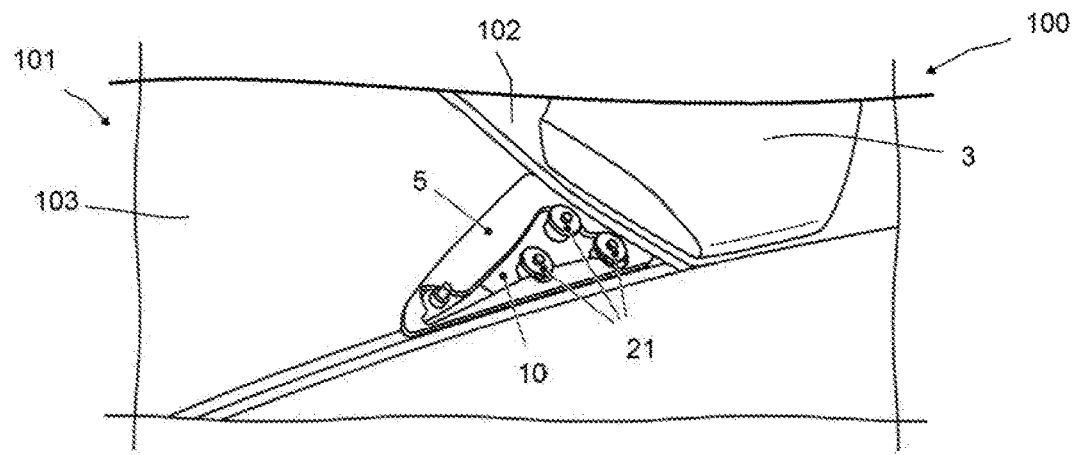
FIG. 4 shows the detail from FIG. 3 in a second mounting step.

FIG. 4 shows the detail from FIG. 3 after a screen 5 has been attached to the receiving device 10. In this case, the support parts 21 are still accessible.

Figure 5:
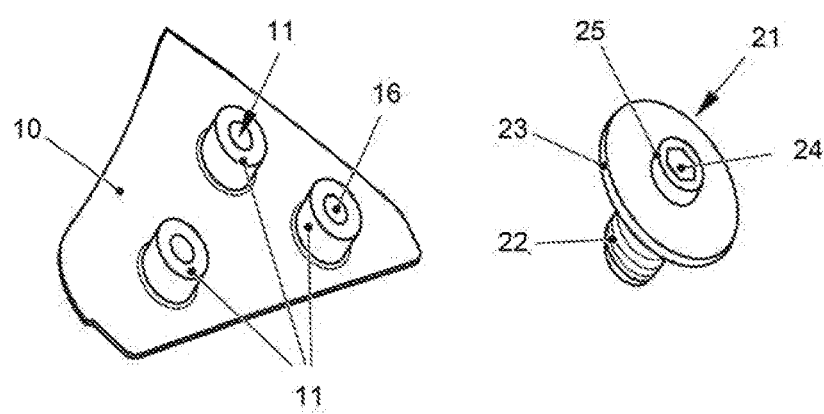
FIG. 5 shows the receiving device and a support part of the fastening arrangement according to FIG. 3.

FIG. 5 shows, on the left-hand side, a perspective view of the receiving device 10 which comprises three receiving parts 11 here. The receiving parts 11 are each of approximately sleeve-like configuration here and each have an internal thread 16 into which a thread section 22 of a support part 21 (right-hand side of FIG. 5) is screwed during mounting. A support part 21 comprises, next to the thread section 22, a support section 23 which—as shown in FIG. 5—can be formed as a peripheral support plate or else, for example, consists of individual radial segments. Furthermore, the support part 21 comprises a guide section 25 which projects upward (Z direction) out of the support section 23.

A tool section 24 is formed on the guide section 25. The tool section can be formed on the outer contour of the guide section 25, but is preferably formed as an inner contour here. A corresponding tool can be inserted into the tool section 24 in order to screw the support part 21 to the receiving part 11. In the process, the height of the support section changes, so that adjustment of the Z position of the support part 21 is possible. By way of targeted positioning of the support parts 21 on the three receiving parts 11, not only can positioning in the Z direction be achieved but three-dimensional angular orientation of the structural element 2 relative to the vehicle roof 101 can also be achieved.

Figure 6:
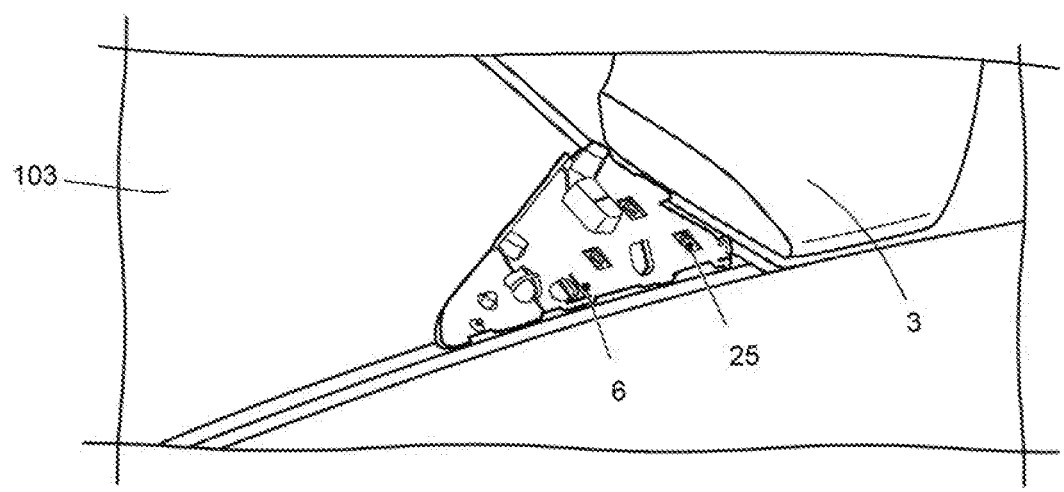
FIG. 6 shows the detail according to FIG. 3 in a further mounting step.
Figure 7:
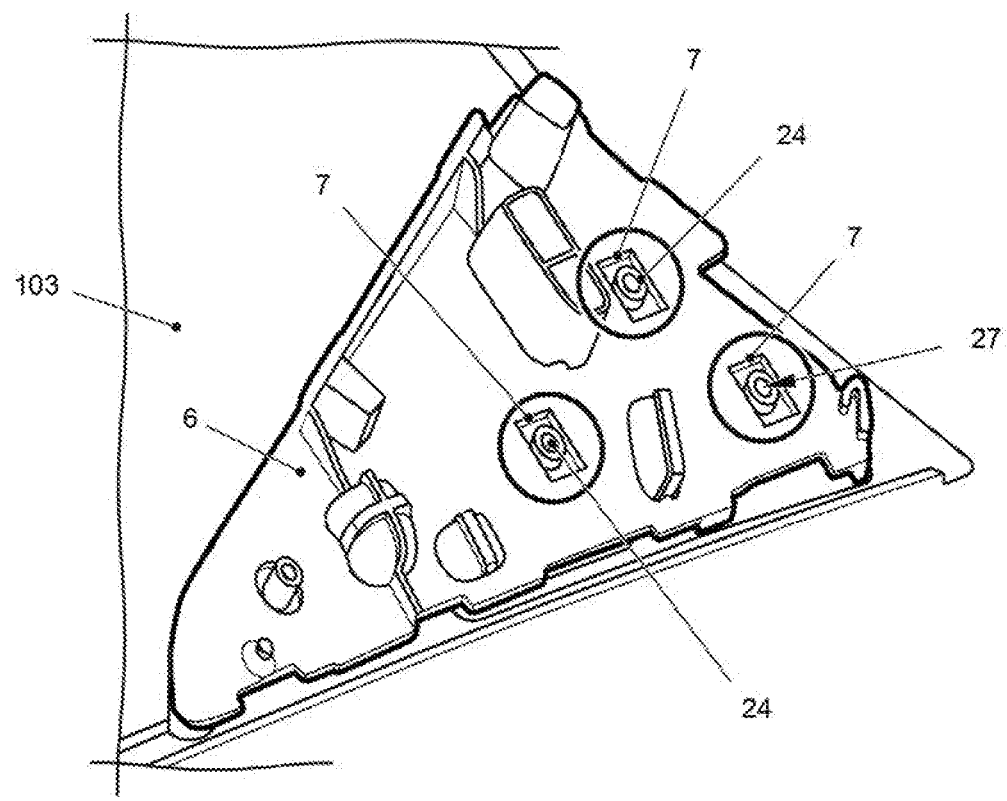
FIG. 7 shows an enlarged plan view of FIG. 6.

FIG. 6 shows a detail according to FIG. 3. Said FIG. 6 illustrates the state which results after the holding device 6 is put into place. The guide sections 25 of the support parts 21 protrude through the receiving holes 7 in the holding device 6 and allow at least rough positioning of the holding device 6 in relation to the support parts 21. Slight shifting and therefore exact orientation in the X and Y direction (compare FIG. 6) is possible. Precise adjustment of the structural element 2 is achieved in this way.

The tool section 24 is formed in the interior of the guide section 25 here. In addition, an internal thread 27 can be provided, for example, further toward the bottom on the support part 21, the fastening elements 31 being screwed to said internal thread for example in order to fix the holding device 6 in the X and Y direction. It is also possible for the fastening elements 31 to be directly adhesively bonded to the holding device 6 and the support parts 21 in order to permanently position the holding device 6 in a defined manner.

Figure 8:
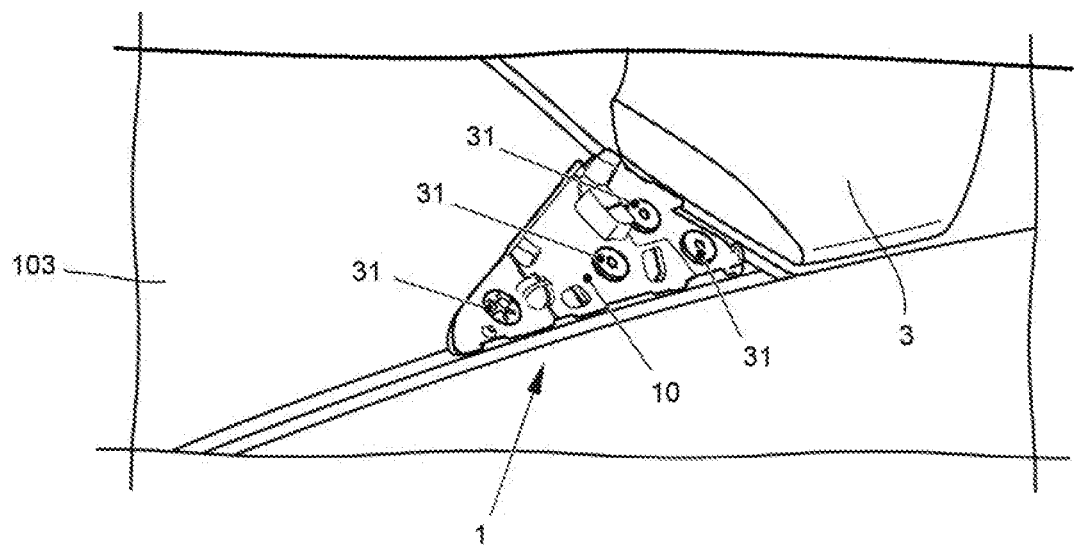
FIG. 8 shows the detail according to FIG. 3 after yet another mounting step.
Figure 9:
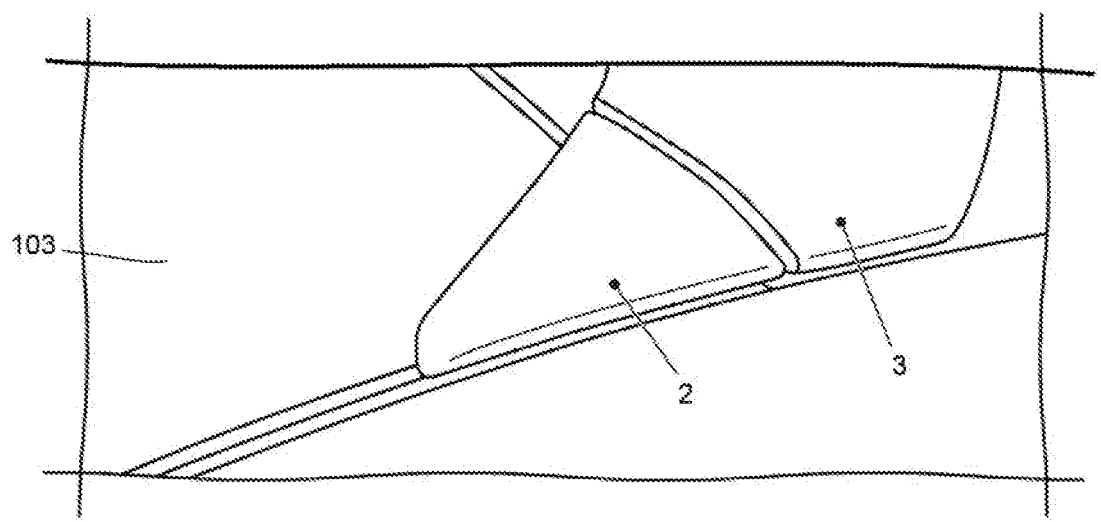
FIG. 9 shows the detail according to FIG. 3 in the completely mounted state.

FIG. 8 shows the detail according to FIG. 3 after mounting of the fastening elements 31. Following this, the structural element 2 can be mounted, so that the overall view is produced, as is illustrated in FIG. 9.

Overall, described herein is an advantageous fastening arrangement for a structural element on a vehicle body part of a passenger car, wherein precisely defined adjustment of the structural element relative to an assembly which is mounted in the region of the vehicle body part is rendered possible. As a result, reliable and simple mounting can be provided and a high manufacturing quality is achieved. In particular, reliable and simple mounting for a structural design element 2 on a vehicle roof 101 is rendered possible.

LIST OF REFERENCE SYMBOLS

1 Fastening arrangement
2 Structural element, structural design element
3 Assembly
5 Screen
6 Holding device
7 Receiving hale
10 Receiving device
11 Receiving part
16 Internal thread
21 Support part
22 Thread section
23 Support section, support plate
24 Tool section
25 Guide section
26 External thread
27 Internal thread
30 Fastening device
31 Fastening element
100 Motor vehicle
101 Vehicle body part, vehicle roof
102 Vehicle body component, roof component
103 Vehicle body component, roof component, glass roof segment
104 Vehicle body
105 Rear windshield

What is claimed is:

1. A fastening arrangement for a structural element on a vehicle body part, wherein the fastening arrangement comprises:
   a receiving device, which is fixedly connected to the vehicle body part; and
   a holding device for fastening the structural element, wherein the holding device is received in a defined manner on the receiving device by a plurality of adjustable fastening devices, and
   wherein the structural element is configured to be adjusted in a defined manner in an X, Y and Z direction,
   wherein each fastening device comprises a receiving part on the receiving device and a vertically adjustable support part, which interacts with the receiving part for vertically adjusting the holding device in the Z direction,
   wherein the support part comprises a thread section, at least one support section that extends transversely to said thread section, and a tool section,
   wherein the support part comprises a guide section, and wherein the guide section projects beyond the support section in the Z direction, and wherein the tool section is formed on said guide section.

2. The fastening arrangement as claimed in claim 1, wherein the thread section of the support part comprises an external thread and interacts with an internal thread in the receiving part.

3. The fastening arrangement as claimed in claim 1, wherein the holding device is fastened to the support part by fastening elements.

4. The fastening arrangement as claimed in claim 3, wherein at least one of the fastening elements is adhesively bonded to the support part.

5. A fastening arrangement for a structural element on a vehicle body part, wherein the fastening arrangement comprises:
   a receiving device, which is configured to be fixedly connected to the vehicle body part;
   a receiving part extending from the receiving device,
   a support part adjustably mounted in a Z-direction on the receiving part, the support part defining a shoulder and a tool section,
   a holding device positioned on the shoulder of the support part, wherein the tool section of the support part is positioned through an aperture on the holding device, and wherein the aperture is oversized as compared with the tool section on the support part such that the holding device can be adjusted in X and Y-directions with respect to the receiving part;
   a fastening element configured to be mounted to the tool section of the support part for fastening the holding device to the receiving device, wherein the fastening element is sized to be positioned between the holding device and the structural element, and
   wherein the structural element is configured to be mounted to the holding device, and the holding device is configured to receive the structural element.

6. The fastening arrangement as claimed in claim 5, wherein the structural element is fitted relative to an assembly which is arranged in a region of the vehicle body part and is visible from an outside of the vehicle.

7. The fastening arrangement as claimed in claim 6, wherein the assembly is fastened to a vehicle body component and the structural element is fastened separately therefrom.

8. The fastening arrangement as claimed in claim 5, wherein the support part comprises a thread section.

9. The fastening arrangement as claimed in claim 8, wherein the support part comprises a guide section.

10. The fastening arrangement as claimed in claim 8, wherein the thread section of the support part is at least one of self-locking and self-tapping design.

11. The fastening arrangement as claimed in claim 10, wherein an inhibiting coating is provided on at least one of the thread section of the support part and a thread section of the receiving part.

12. The fastening arrangement as claimed in claim 5, wherein at least one receiving hole is formed in the holding device.

13. The fastening arrangement as claimed in claim 12, wherein the at least one receiving hole is a rectangular hole and is configured to allow adjustment in the X and Y direction.

14. The fastening arrangement as claimed in claim 5, wherein the structural element is fastened to a glass roof segment of a vehicle roof, and the receiving device is fastened to said glass roof segment by encapsulation by foaming.

15. The fastening arrangement as claimed in claim 5, wherein the vehicle body part is a vehicle roof and the structural element is a structural design element.

* * * * *